United States Patent [19]

Gautney

[11] 3,746,991

[45] July 17, 1973

[54] REMOTE CONTROL COMMUNICATIONS SYSTEM

[75] Inventor: George E. Gautney, Annandale, Va.

[73] Assignee: Gautney & Jones, Falls Church, Va.

[22] Filed: July 15, 1970

[21] Appl. No.: 55,101

[52] U.S. Cl. ........................ 325/55, 325/58, 325/64, 325/420, 340/171 R, 343/225

[51] Int. Cl. ............................................ H04b 7/00

[58] Field of Search ................... 325/30, 49, 50, 55, 325/64, 63, 58, 37, 420, 421, 422, 423; 340/170, 171, 167; 343/225, 227, 228; 179/15 BY

[56] References Cited

UNITED STATES PATENTS

| | | | |
|---|---|---|---|
| 3,175,155 | 3/1965 | Holder | 325/49 X |
| 3,084,328 | 4/1963 | Groeneveld et al. | 325/49 |
| 3,233,221 | 2/1966 | Perlin et al. | 340/147 |
| 3,619,782 | 11/1971 | Stocks | 325/63 X |

*Primary Examiner*—Benedict V. Safourek
*Attorney*—Rose and Edell

[57] ABSTRACT

A transmitter, which remotely controls the demuting of a normally muted radio receiver, derives a command signal from a carrier wave, the command signal having a frequency or a duration which is precisely related to the frequency of the carrier wave. The receiver derives a reference signal from the received carrier wave, having a frequency which is a predetermined fraction of the frequency of the carrier wave, detects the command signal, and compares a time parameter of the command signal (either its frequency or duration) with the frequency of the reference signal. If a predetermined relationship exists, a control signal is provided for controlling a muting/demuting circuit in the receiver. Selective addressing of a particular receiver may be effected by providing the transmitter with means for deriving a plurality of command signals, each having a different time parameter corresponding to a particular receiver, and selective keying means for selecting one of the command signals for transmission. The carrier wave may be a pilot carrier which, in turn, modulates a main carrier wave of the transmitter.

16 Claims, 6 Drawing Figures

INVENTOR
GEORGE E. GAUTNEY

BY Hurvitz & Rose
ATTORNEYS

INVENTOR

GEORGE E. GAUTNEY

BY Hurvitz & Rose

ATTORNEY

INVENTOR
GEORGE E. GAUTNEY
BY Hurvitz & Rose
ATTORNEYS

INVENTOR
GEORGE E. GAUTNEY

BY Hurvitz & Rose
ATTORNEYS

INVENTOR
GEORGE E. GAUTNEY
BY Hurvitz & Rose
ATTORNEYS

REMOTE CONTROL COMMUNICATIONS SYSTEM

BACKGROUND OF THE INVENTION

This invention relates to remote control communication systems and, more particularly, to systems in which a transmitter transmits a command signal for controlling the demuting of normally muted remote receivers. The invention is applicable to various systems in which selective control of a remote receiver is desired, for instance, selective addressing, two way radios, telemetry and selective paging systems to mention a few. For purposes of explanation, however, the present invention is initially discussed in terms of an emergency warning system.

It has been proposed that a comprehensive emergency warning system comprise a large plurality of widely dispersed individual receivers located in homes, government offices, schools, and the like. In a system of this character, the receivers are normally muted and should respond to an emergency command signal for demuting the receivers to broadcast warning of the emergency. Since such a system requires many receivers which are normally inactive, it is desirable that the receivers be relatively inexpensive. Moreover, the system should be highly reliable. Accordingly, the receivers must be highly insensitive to adjacent frequencies, be very stable, perform capably in the presence of noise, and perform reliably even after extended idle periods.

There have been a number of proposals in the prior art for remotely controlling the muting and demuting of receivers. One prior art method employs the transmission of two frequency tones and the use of a receiver having narrow band, high Q resonant reed relays. While systems of this character are quite secure from false operation and quite sensitive to the demuting signal, resonant reed relays of a quality sufficient for the requirements of the system are too costly for the purpose. Inexpensive reeds do not provide adequate performance. Although digital approaches have been suggested to avoid the faults of resonant reed relays, such prior art digital schemes have proven to be rather insensitive to the demuting signal and have behaved erratically in the presence of noise.

Other difficulties arise in these and other types of emergency warning systems particularly of the type which are accessible to roads. Pranksters employ receivers of the type to be controlled to receive the transmitted control signals and apply the received signals to a tape recorder for subsequent playback to produce a false sounding operation of the equipment.

SUMMARY OF THE INVENTION

It is accordingly the principal object of the invention to provide a highly reliable, relatively inexpensive remote control communications system.

It is a further object of the invention to provide a remote control radio communications system which requires relatively inexpensive components in the receiver, is highly insensitive to closely adjacent frequencies and noise, is quite stable, performs capably in the presence of noise and has a high degree of reliability.

A more specific object involves the provision of a receiver muting-demuting system of this character.

An additional object relates to the provision of selective addressing means in a system of the aforementioned type.

According to the present invention, a transmitted carrier wave is modulated by a command signal which has a time parameter precisely related to a corresponding time parameter (frequency or phase) of the carrier wave. The receiver includes means for deriving a reference signal from the received carrier also having a time parameter with a precise relationship to the corresponding time parameter of the carrier wave. The receiver includes means to detect the command signal and comparison means for comparing the time parameters of the command signal and reference signal. When these time parameters bear a predetermined relationship for a specified period of time, a control signal is developed for remotely controlling the apparatus at the receiver. In the case of a muting-demuting system, the control signal controls the demuting of the normally muted receiver.

In one embodiment, the command signal is derived from the carrier wave by frequency divider means and has a frequency which is a predetermined fraction of the frequency of the carrier wave. Upon the closing of a keying switch, the command signal modulates the carrier wave. In the receiver for this embodiment, the command signal is detected and compared with a signal derived by dividing the received carrier wave by the same fraction as the carrier was divided in the transmitter to derive the command signal. The comparator produces a specified output signal when the two frequencies are identical for at least a specific length of time. This operation causes a capacitor to charge to a voltage level exceeding the threshold of a threshold circuit, which in turn, provides a control signal to the demuting circuit, causing it to demute the receiver. Thereafter if an output signal is not provided by the comparator for a predetermined time period, the charge on the capacitor leaks off through a resistor until the threshold circuit removes the control signal permitting the receiver to again become muted. Reliability is the result of the fact that since both signals applied to the comparator are derived from the same oscillator (the transmitter carrier oscillator) the frequency of the two signals do not change relative to one another with time and by appropriate choice of the time constant of the capacitor the probability of demuting in response to random noise may be virtually eliminated. The same features are available in a phase system, the signals being derived from the same oscillator have locked phases which can be detected in a phase detector at the receiver.

In another embodiment of the invention, the command signal in the transmitter is derived by counting a predetermined number of cycles of the carrier wave to develop a timing signal having a duration which is a function of the frequency of the carrier wave. This timing signal is then used to modulate the carrier wave. In the receiver for this embodiment, the reference signal is provided in the manner already described. The timing signal is detected and utilized for controlling the counter to establish a counting period within which the cycles of the reference wave are counted.

It is also contemplated by the invention that the transmitter include means for selectively addressing particular receivers. The transmitter provides a plurality of command signals, each with a different time parameter, such as time duration, and includes selective keying means to select one of the command signals for modulating the carrier wave. In each receiver, the counter is so designated that only a command signal of the proper time parameter will cause a control signal to be provided.

In another embodiment of the invention, it is contemplated that the carrier wave be a pilot carrier wave. After the pilot carrier wave is modulated with the command signal in the manner previously described, it is used to modulate a main carrier of the transmitter.

The foregoing and other objects, advantages, and features of the invention and the manner in which the same are accomplished will become more readily apparent upon consideration of the following detailed description of the invention when taken in conjunction with the accompanying drawings, which illustrate perferred and exemplary embodiments.

DETAILED DESCRIPTION

Although it is to be understood that the present invention has broad applicability to any remote control system of the type in which a transmitter transmits a command signal to one or more remote receivers for controlling the actuation of apparatus within or near the receiver, it will be described herein with specific reference to muting/demuting systems in which the command signal transmitted by the transmitter serves to control the muting-demuting condition of the remote receiver. In such a system, the command signal is normally absent with the result that the receivers are all maintained in a muted condition. However, when it is desired to broadcast an emergency or information signal, a command signal is transmitted by the transmitter and, when detected by the receivers, causes them to switch from a muted to a demuted condition allowing perception of the incoming emergency or information signal.

Figure 1:
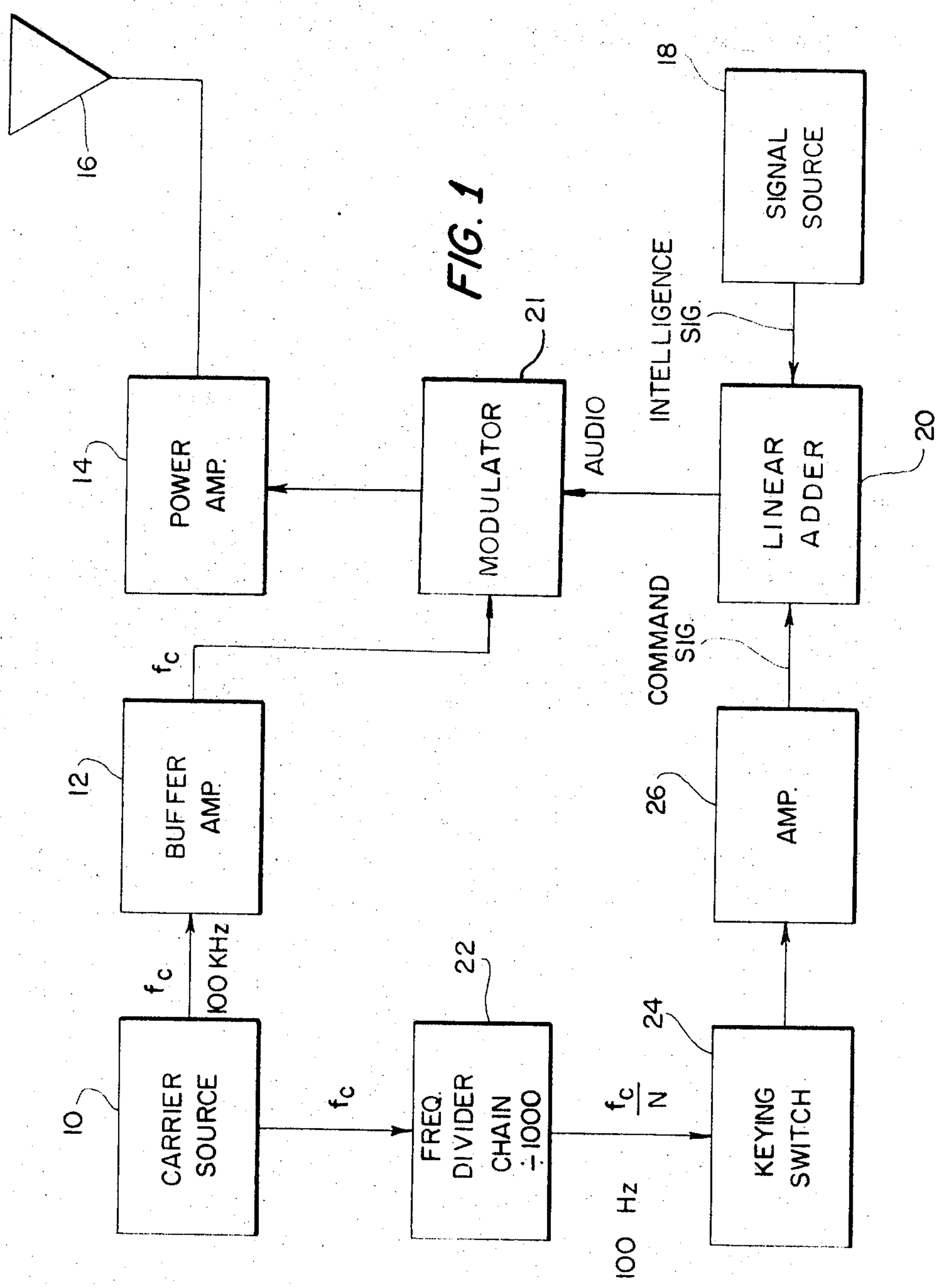
FIG. 1 is a schematic diagram of a transmitter according to the invention.

Turning now to FIG. 1 of the accompanying drawings, it will be seen that a transmitter according to a first embodiment of the invention includes a source 10 of a carrier wave having a frequency $f_c$. The carrier wave is coupled through a buffer amplifier 12 to a modulated 21. An intelligence signal from an intelligence signal source 18 is applied to a linear adder 20 to which is added a command signal when such is generated. The output signal of the adder 20 is applied to the modulator 21 and the modulated carrier output signal thereof is applied through a power amplifier 14 to a transmitting antenna 16 which causes amplitude modulation of the carrier wave in power amplifier 14 as is well known in the art.

According to the present invention, a command signal is derived from the carrier wave. To this end, the carrier source 10 supplies the carrier wave signal of frequency $f_c$ to a frequency divider chain 22 which provides an output signal of frequency $f_c/N$ . This signal, which has a frequency precisely related to the frequency $f_c$ of the carrier wave and which is of relatively low level, is selectively applied through a keying switch 24, whenever it is desired to transmit a command signal, and an amplifier 26 to linear adder. The amplitude modulator 21 modulates the carrier wave in accordance with both the intelligence signal received from signal source 18 and the lower level command signal derived by the frequency divider chain 22. The transmitter thus transmits a carrier wave of frequency $f_c$ which is amplitude modulated by an intelligence signal, which might relate to the emergency warning, a page (call), or other intelligence signal, and also by a command signal whose frequency has a time parameter (frequency) which is a precise function of the frequency of the carrier wave.

While a wide range of possible carrier frequencies and divisors N may be chosen, in one typical practical embodiment, as illustrated in FIG. 1, a carrier frequency of 100 KHz. and a divisior N having a value of 1,000 were employed. As indicated in the figure, the divider chain 22 divides the carrier wave frequency by 1,000 providing an output command signal having a frequency of 100 Hz. As is subsequently explained in connection with the description of the receiver associated with the transmitter of FIG. 1, the frequency of the command signal is preferably below the passband of the loudspeaker employed in the receiver. It should also be borne in mind that the reliability of the system in the presence of noise is related inversely to the frequency of the command signal. On the other hand, lower frequency command signals increase the response time of the system. It has been found that 100 Hz, represents a good compromise of reliability and response time.

Figure 2:
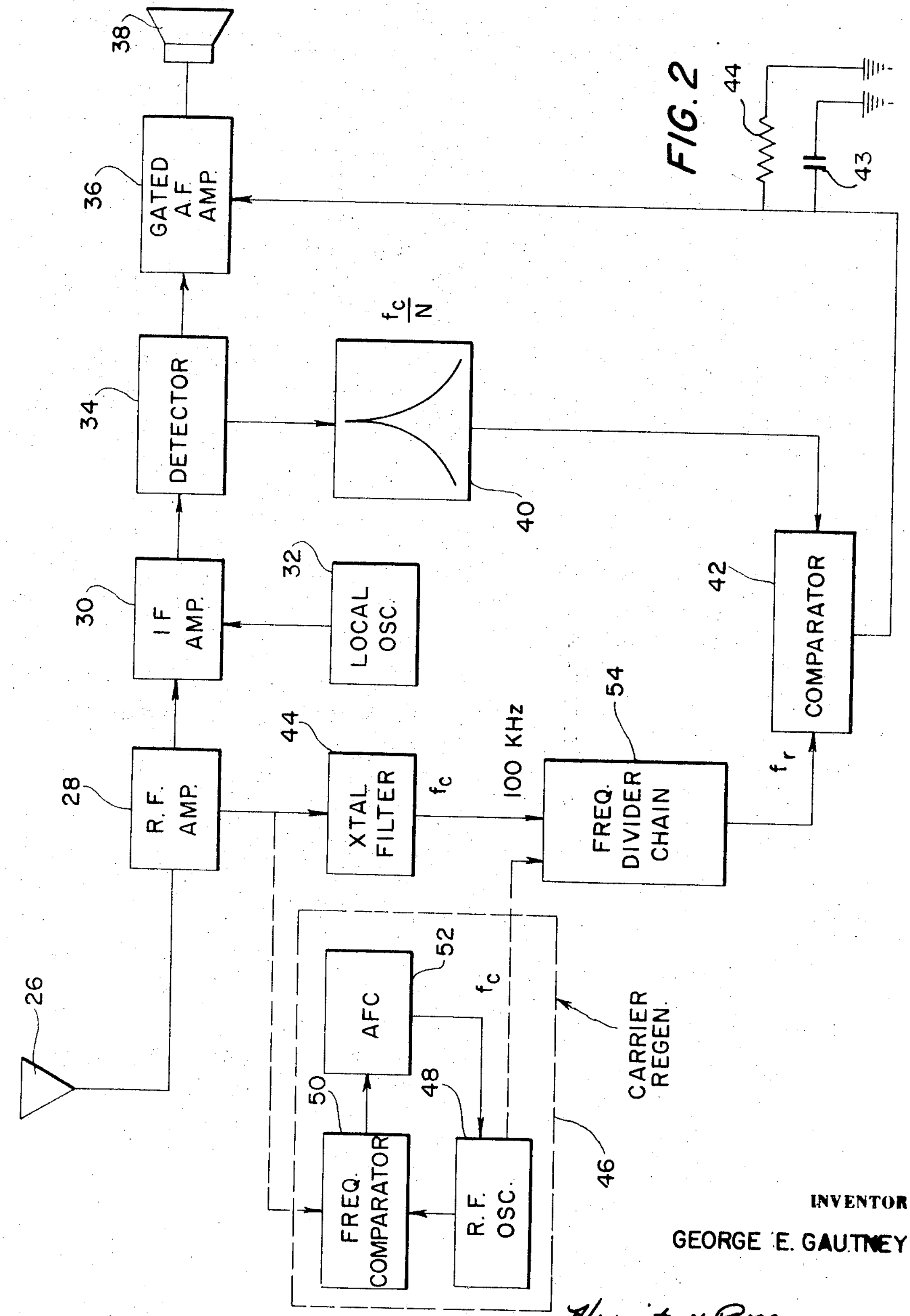
FIG. 2 is a schematic diagram of a receiver according to the invention for use with the transmitter of FIG. 1.

The transmitted signal is received by a special receiver of a type generally shown in FIG. 2. The receiver includes a receiving antenna 26 and a selective radio frequency amplifier 28, which is tuned to the frequency of the carrier wave and amplifies the received modulated carrier signal. This signal is converted to an intermediate frequency and amplified in IF amplifier circuit 30 which, as is well known in the art, includes a converter cooperating with the signal from a local oscillator 32. The intermediate frequency signal is coupled to a detector 34 having two outputs. One of the outputs couples the detected intelligence signal to a gated audio frequency amplifier 36. In the normal operation of the receiver, this amplifier is biased, or switched, to prevent coupling of the audio frequency signal detected by detector 34 to the loudspeaker 38, thus maintaining the receiver in its muted condition. As will be presently described, the reception of a command signal having the proper time parameter will result in actuation of the gated audio frequency amplifier so as to couple the detected intelligence signal to the loudspeaker.

The other output from detector 34 is connected to a narrow band filter 40 tuned to pass the command signal. In the example given, this filter passes signals of 100 Hz. and excludes the intelligence signal which normally falls in the audio band above 100 Hz. There is no need to provide a high pass filter between the detector 34 and gated AF amplifier 36 to exclude the 100 Hz. command signal provided that the frequency of the command signal is selected to be below the passband of loudspeaker 38. The output from filter 40 is coupled to a comparator 42 which serves to compare a time parameter of the command signal (its frequency) with a time parameter of a reference signal derived from the received carrier wave.

As illustrated in FIG. 2, this reference signal may be derived from the carrier wave in two alternative ways. As shown in the path designated by full line, a crystal or other narrow band filter 44 may be employed to pass the carrier frequency $f_c$. It is important that this filter be of high quality, having a very narrow band and a very high Q so that the frequency passed thereby closely adheres to the frequency of the carrier wave as transmitted by the transmitter. Since a crystal filter of this type is relatively expensive, it is also possible, as shown in the dash-line path of FIG. 2, to employ a less costly carrier regenerator circuit 46. This circuit includes a RF oscillator 48 designed to have an output frequency approximating the frequency $f_c$ of the carrier wave. In fact, it is the purpose of the carrier regenerator circuit to insure that the output of RF oscillator 48 is maintained in close correspondence (slaved) to this frequency. To this end the output from RF amplifier 28 is connected to a frequency comparator 50, the other input to which is received from RF oscillator 48. The frequency comparator develops an error signal when there is a difference between the frequency output of RF oscillator 48 and the frequency of the carrier wave as received from RF amplifier 28. This error signal adjusts an automatic frequency circuit 52 for providing a correction signal to adjust the frequency of RF oscillator 48, thus correcting for the frequency deviation of the oscillator from the frequency of the carrier wave. Although either method of providing a signal having the frequency of the carrier wave may be employed, the advantages and disadvantages of the two techniques should be considered. The carrier regenerator circuit is less costly than the crystal filter and is less sensitive to noise. However, there is the possibility when using the carrier regenerator circuit that it will lock on a wrong closely adjacent carrier thereby providing an inaccurate response.

The output from crystal filter 44 or the output from carrier regenerator 46 has, as was just explained, a frequency equal to the frequency $f_c$ of the carrier wave which, in the example given, is a frequency of 100 KHz. This signal is applied to a frequency divider chain 54. The output from frequency divider chain 54 is a reference signal of frequency $f_r$ having a time parameter (its frequency) which is a function of the frequency $f_c$ of the carrier wave. A comparison of the time parameter of the reference signal and the time parameter of the command signal is made in comparator 42. When this comparison indicates that there is a predetermined relationship between these time parameters, an output control signal is provided from comparator 42 and is supplied to an integrator circuit including a capacitor 43 connected in parallel with a resistor 44. The time constant of the RC circuit is chosen such that after receipt of the time and carrier signals for a specified length of time, for instance, 10 seconds, the threshold voltage of the gated AF amplifier 36 is exceeded. Such operation causes the activation of gated AF amplifier 36 permitting the passage of audio frequency signals therethrough to loudspeaker 38, thus demuting the receiver.

The system of FIGS. 1 and 2 operate on frequency comparison but phase comparison can also be employed and provides certain advantages over a frequency system. In a phase system good system reliability can be obtained even though the two signals employed are not widely separated and are both above the audible level. The transmitter for such a system is basically the same as that illustrated in FIG. 1 except that division of the carrier is by, for instance, 3 instead of 1,000 as in the case of a frequency system.

Figures 3, 5:
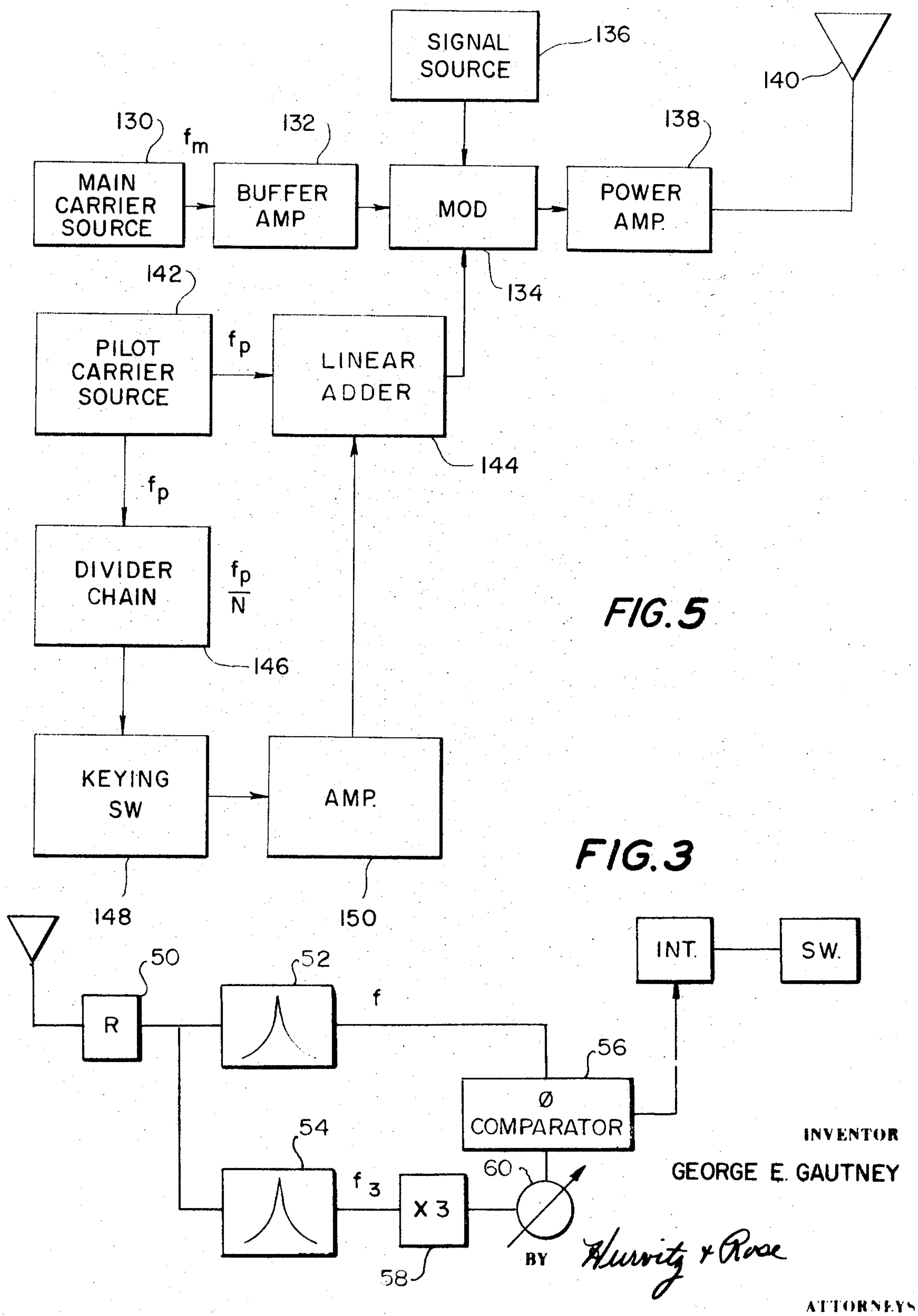
FIG. 3 is a schematic diagram of a phase comparison system of the present invention.
FIG. 5 is a schematic diagram of another embodiment of transmitter according to the invention.

The receiver for such a system is illustrated in FIG. 3 and comprises a conventional receiver 50, narrow band filters 52 and 54 for the carrier frequency f and the control frequency $f/3$, respectively. The output signal of filter 52 is applied directly to one input of a phase comparator 56. The output signal of filter 54 is multiplied by 3 in multiplier 58 and applied through a variable phase changer 60 to the comparator 56. The output signal of the comparator 56 is integrated and applied to the gated amplifier of the prior figures for instance.

As indicated above, the phase system permits use of high frequencies without loss of accuracy or reliability. Also in a system of this type it is quite difficult to produce false operation of the system by recording transmitted control signals and subsequently playing them back. The phase lock requirements in the system of FIG. 3 are such that almost no phase shift down to the d.c. level can be tolerated. The phase shift of one signal to the other in the system of FIG. 3 is connected by the phase shifter or changer 60 and is set upon the system initially being put into operation.

When the tone signal is removed no signal appears on the output lead from the comparator 42 and after the desired time interval (for instance twelve seconds), the voltage level across capacitor 43 falls below the threshold of gated amplifier 36 and the amplifier reverts to its deactivated condition, again muting the receiver.

In the operation of the system just described, the receiver of FIG. 2 is normally maintained in its muted condition because gated AF amplifier 36 blocks signals from detector 34, preventing any output from reaching loudspeaker 38. When, however, keying switch 24 of the transmitter of FIG. 1 is closed, a command signal which, in the example given, has a frequency equal to one thousandth the frequency of the carrier wave, is caused to modulate the carrier wave. The thus modulated carrier wave is received by the receiver which derives the reference signal from the received carrier wave and compares it with the carrier wave after appropriate division. If the carrier and time are proper for a particular receiver or set of receivers a voltage appears across storage capacitor 43 which demutes the gated AF amplifier 36.

If, however, the received command signal is not of the proper frequency, a sustained voltage is not applied to capacitor 43 and the receiver is not demuted. This latter condition will exist regardless of the reason the comparator does not produce a sustained signal, e.g., a wrong time or random noise.

While, in the embodiment just described, the command signal is transmitted as a frequency tone precisely related in frequency to the frequency of the carrier wave, it is also possible to transmit a command signal having a duration which is precisely related to the frequency of the carrier wave. In such an embodiment, it is possible, by selecting command signals of different time durations, all related to the frequency of the carrier wave, to provide for selective addressing of receivers. The manner of implementing this embodiment and these concepts is illustrated in FIG. 4.

Figure 4:
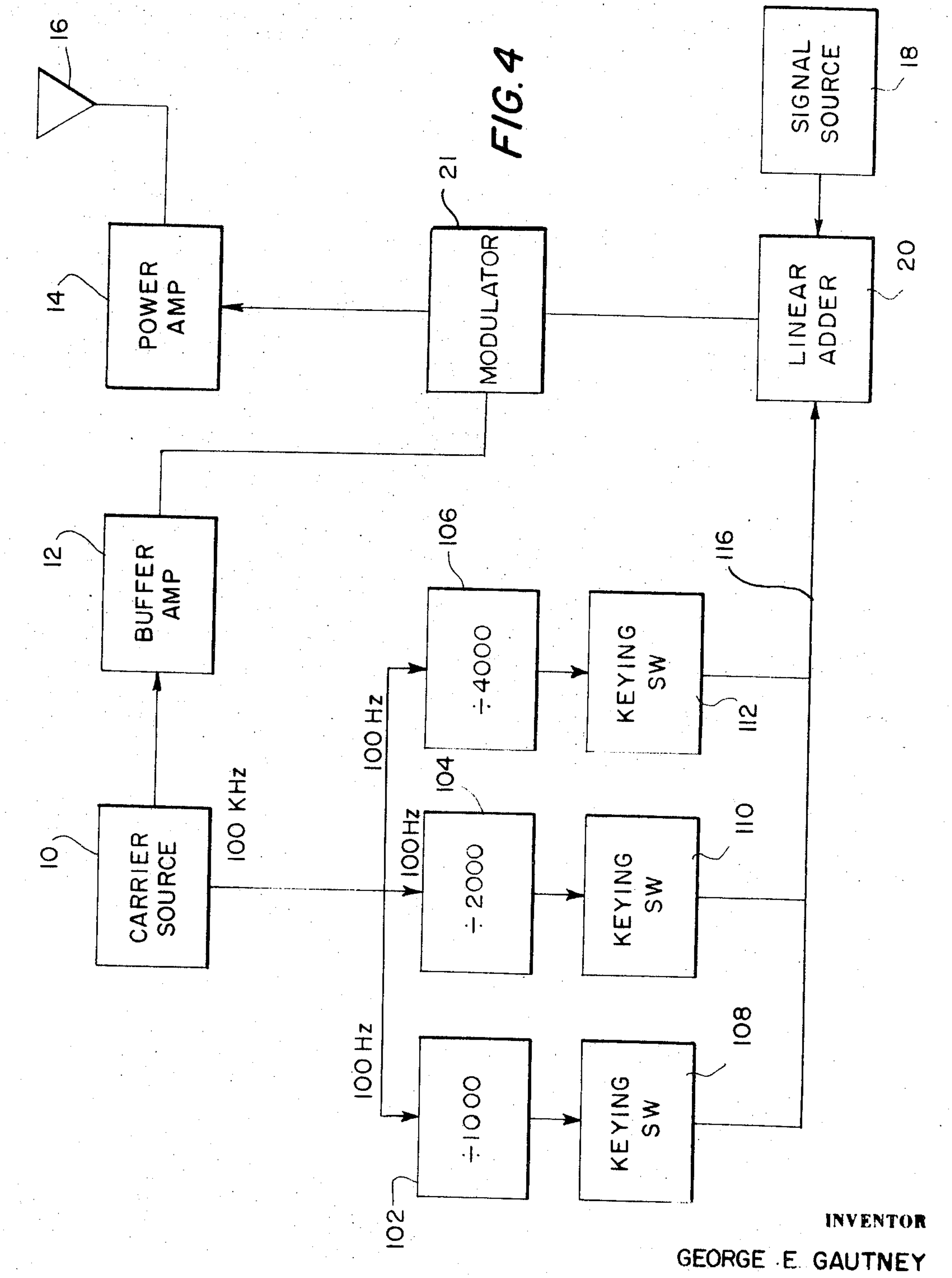
FIG. 4 is a schematic diagram of another embodiment of transmitter of the invention.

Turning to FIG. 4, it will be seen that a transmitter according to this embodiment again comprises the carrier source 10, a buffer amplifier 12, a power amplifier 14, and a transmitting antenna 16. An intelligence signal source 18 is added to signals 116 in a linear adder 20 and the sum amplitude modulates the carrier wave in modulator 21. In accordance with the present invention, the transmitter of FIG. 4 also employs three frequency dividers 102, 104 and 106 which, in the example given, divide the 100 KHz. frequency of the carrier wave by 1,000, 2,000 and 4,000, respectively, providing output signals of 100, 50 and 25 Hz. In this way, a plurality of command signals are provided, each having signals of different frequencies, each of which is precisely related to the frequency of the carrier wave.

Although only three command signals are provided in the illustration given in FIG. 4, it is to be understood that any number of command signals may be derived in this way so as to provide a wide range of selective addressing of a large number of remote receivers. It is even possible, by combining two comand signals in combination, to multiply greatly the possible field of addressable receivers.

In order to select a particular command signal, a plurality of keying switches 108, 110, and 112 are respectively provided for selecting the output 116 of a particular divider 102, 104 or 106. These signals are detected at a particular receiver by a filter, filter 40 of FIG. 2, tuned to the particular frequency 100, 50 or 25 Hz. designated for that receiver. Thus a particular receiver or a particular group of receivers may be called, demuted, by selection of a particular switch 108, 110 or 118.

It is sometimes necessary to employ a carrier frequency in the transmitter which is greatly in excess of the frequencies used in the illustrations given with respect ot the embodiments already described. If the carrier frequency is too high, it becomes impractical to divide down for the derivation of the command signal and the reference signal. For example, it has been found that with a carrier frequency in excess of 450 MHz., it is no longer feasible to use the divide down technique. However, by employing a pilot carrier of lower frequency which is used to modulate the main carrier of the transmitter, this problem is avoided.

Figure 6:
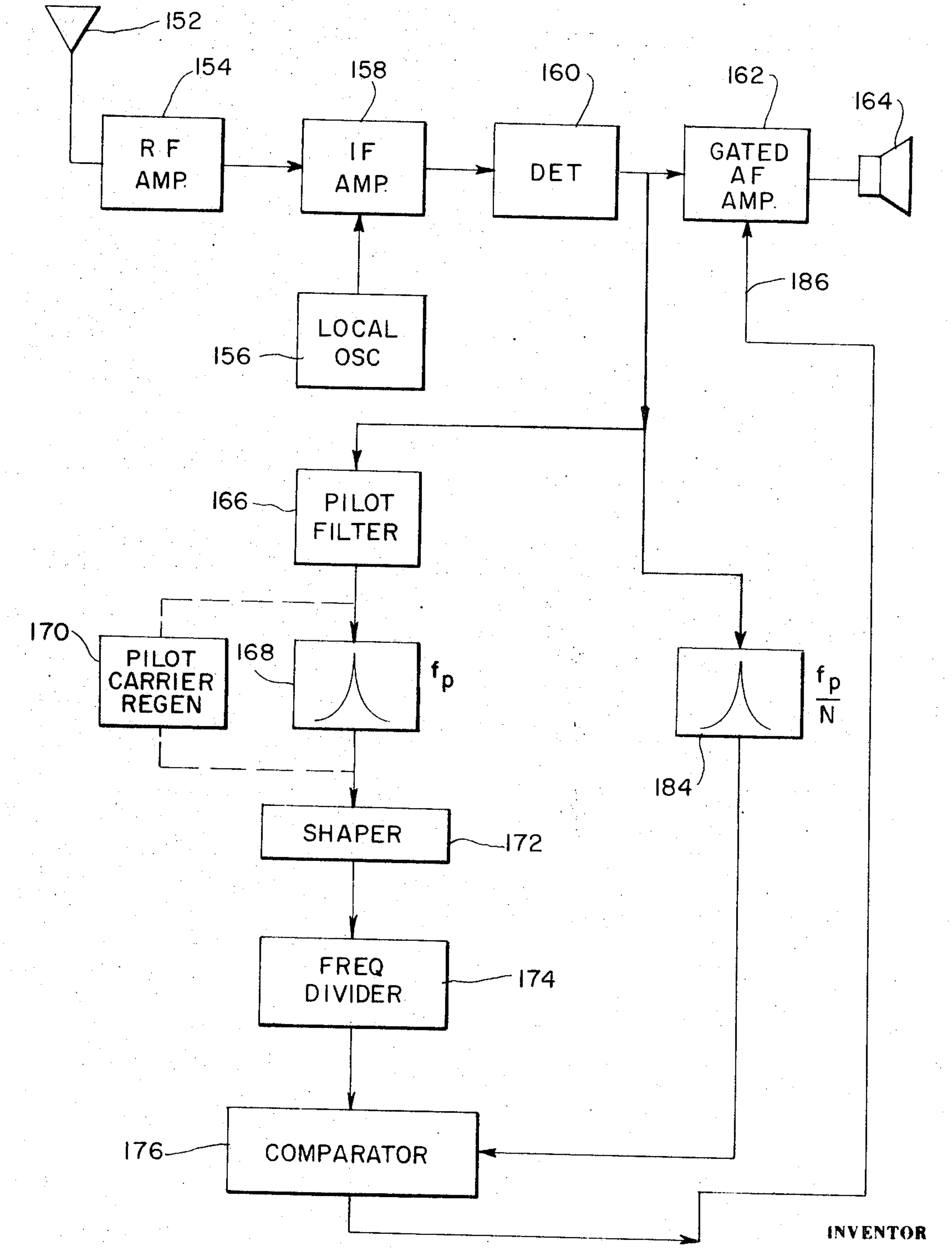
FIG. 6 is a schematic diagram of an embodiment of receiver to be used in conjunction with the transmitter of FIG. 5.

The use of a pilot carrier for this purpose is illustrated in the transmitter of FIG. 5 and receiver of FIG. 6. Turning to FIG. 5, it will be seen that a main carrier source 130 provides a carrier wave having a frequency $f_m$. This carrier wave is provided through a buffer amplifier 132 to a modulator 134 where it is modulated by an intelligence signal supplied from a signal source 136. This modulated signal is applied 138 for transmission by transmitting antenna 140.

In this embodiment, the command signal is derived from the pilot carrier and has a time parameter which is precisely related to the frequency of the pilot carrier. A pilot carrier source 142 provides a pilot carrier wave having a frequency $f_p$ which is applied to a linear adder 144. An output from pilot carrier source 142 is also applied through a frequency divider chain 146 which provides a command signal having a frequency $f_p/N$ which has a time parameter (frequency) which is precisely related to and is a function of the frequency $f_p$ of the pilot carrier wave. This command signal is selectively applied by actuation of keying switch 148 through an amplifier 150 to linear adder 144 where it is added to the pilot carrier wave. The pilot carrier wave modulates the main carrier wave in modulator 134 and the combined signals are applied to power amplifier 138. Antenna 140 will thus transmit a signal comprising the main carrier wave modulated by the intelligence signal and by the pilot carrier which, in turn, is modulated by the command signal.

The receiver intended to cooperate with the transmitter of FIG. 5 is shown in FIG. 6. The receiving antenna 152 receives the pilot modulated wave just described applying it through a RF amplifier 154 to be mixed with a signal from local oscillator 156 providing an IF output from IF amplifier 158. The output received from IF amplifier 158 is detected by detector 160 providing a detected intelligence signal to gated AF amplifier 162. This amplifier is normally maintained inactivated so as to mute the receiver. As will be presently described, the reception of a command signal will cause gated AF amplifier 162 to become activated to demute the receiver and provide an intelligence signal through loudspeaker 164.

The modulated pilot carrier wave is also detected by detector 160 and is provided through a pilot filter 166 which selects the pilot carrier wave. The output from pilot filter 166 is employed for the creation of a reference signal. To this end, the pilot carrier wave is applied through a high quality crystal filter 168 or, alternatively, is used to frequency lock a pilot carrier regenerator circuit 170. Since pilot carrier regenerator circuit 170 will generally resemble, and operate on the same principles as, the carrier regenerator circuit 46 of the embodiment of FIG. 2, it will not be described in any detail here. In either event, a signal having the frequency $f_p$ of the pilot carrier wave will be applied through shaper 172 to a frequency divider 174 which will divide the frequency to provide a reference signal having a time parameter (its frequency) which is precisely related to the received pilot carrier wave. This reference signal is applied to comparator 176.

The output signal from the detector is also applied to a narrow band filter 184 and applied to another input terminal of comparator 176. Since the operation of comparator 176 will generally resemble the operation described with reference to FIG. 2, there is no need to repeat the description of this operation here. Suffice to say that upon comparator 176 determining that there is a predetermined relation between the time parameters of the reference signal and the command signal applied thereto, a control signal will be applied to the control input terminal 186 of gated AF amplifier 162 causing activation of this amplifier and the demuting of the receiver.

An additional feature of the invention is the ability to use the power line frequency as a time signal so long as the transmitter and receiver stations are supplied by the same power station. In such a system, the carrier source at the transmitter is modulated by the 60 Hz. power line signal. The transmitter power frequency signal is removed from the carrier as in FIG. 2, and compared with the local power line voltage, so long as the two 60

Hz. signals are derived from the same power plant, their frequencies drift in synchronism and a sustained output signal is derived from the frequency comparator.

In such a system the command signal supplied to linear adder 20 could be derived from a voltage divider connected across the power line. By the same arrangement the signal $f_r$ of FIG. 2 can be derived and applied to the comparator 42. A number of components of each of the circuits of FIGS. 1 and 2 could thus be eliminated.

While preferred embodiments of the invention have been shown and described, it will be apparent to those skilled in the art that changes can be made without departing from the principles and spirit of the invention, the scope of which is defined in the appended claims.

I claim:

1. A communications system, comprising: a transmitter and a remote receiver; said transmitter including a source of a carrier wave, means to derive a command signal from said carrier wave having a time parameter having a fixed relationship with the frequency of said carrier wave, means to modulate said carrier wave with said command signal, and means to transmit the modulated carrier wave; and said receiver including means to receive said modulated carrier wave, means to derive a reference signal from said received carrier wave having a time parameter which is a function of the frequency of said received carrier wave, means to detect said command signal modulated on said received carrier wave, comparison means for comparing said time parameters of said detected command signal and said reference signal and for providing a control signal in response to a predetermined relationship between said time parameters, and apparatus controlled by said control signal.

2. A communications system as recited in claim 1, said system being a muting/demuting system and said receiver including means for muting an output from said receiver and responsive to said control signal for demuting said output from said receiver.

3. A communications system as recited in claim 2, wherein said transmitter includes means for transmitting an intelligence signal and said receiver includes means for detecting said intelligence signal and providing said intelligence signal as said output.

4. A communications system as recited in claim 1, wherein said means to derive a command signal comprises frequency divider means for providing a command signal having a frequency which is a predetermined fraction of the frequency of said carrier wave, said frequency of said command signal being said time parameter of said command signal.

5. A communications system as recited in claim 4, wherein said means to derive said command signal further comprises keying means for selectively providing said command signal.

6. A communications system as recited in claim 4, wherein said comparison means comprises means for deriving a timing signal from said detected command signal the duration of which is a function of the frequency of said command signal.

7. A communications system as recited in claim 1, wherein said means to derive a command signal comprises means for providing a command signal which is a predetermined fraction of the frequency of said carrier wave, and wherein said comparison means includes a frequency multiplier for multiplying said command signal by the inverse of said predetermined fraction and phase comparison means for comparing the phase of said carrier wave and the output signal from said frequency multiplier.

8. A communications system as recited in claim 1, wherein said means to derive a command signal is adapted to derive a plurality of command signals from said carrier wave, each having a different time parameter, and comprises selective keying means to transmit a selected command signal, and wherein said system comprises a plurality of remote receivers, the comparison means in each of said receivers being adapted to provide a control signal in response to the reception of a particular one of said command signals, whereby only receivers responsive to the selected command signal will provide a control signal.

9. A communications system as recited in claim 1, wherein said carrier wave is a pilot carrier wave, wherein said transmitter comprises a source of a main carrier wave, said main carrier wave being modulated by said pilot carrier wave after said pilot carrier wave is modulated by said command signal, and wherein said receiver comprises means to receive said modulated main carrier wave and to detect said modulated pilot carrier wave.

10. A communications system as recited in claim 1, wherein said receiver comprises hold means for maintaining said control signal for a time interval following cessation of said command signal.

11. A carrier wave receiver, comprising:

means for receiving a carrier wave modulated by a command signal having a time parameter having a fixed relationship with the frequency of said carrier wave;

means to derive a reference signal from said received carrier wave having a time parameter which is a function of the frequency of said received carrier wave;

means to detect said command signal modulated on said received carrier wave;

comparison means for comparing said time parameters of said detected command signal and said reference signal and for providing a control signal in response to a predetermined relationship between said time parameters; and apparatus having at least two states and including means for effecting one of said states when said control signal is provided and for effecting the other of said states in the absence of said control signal.

12. A carrier wave receiver as recited in claim 11, wherein said apparatus comprises means for muting an output from said receiver and responsive to said control signal for demuting said output.

13. A carrier wave receiver as recited in claim 12, further comprising means for detecting an intelligence signal modulated on said carrier wave, said detected intelligence signal comprising said output.

14. A transmitter for remotely controlling a remote receiver comprising:

a source of a carrier wave;

means to derive a command signal from said carrier wave having a time parameter having a fixed relationship with the frequency of said carrier wave;

means to modulate said carrier wave with said command signal;

means to transmit the modulated carrier wave; and means to transmit an intelligence signal;

wherein said means to derive a command signal comprises frequency divider means for providing a command signal having a frequency which is a predetermined fraction of the frequency of said carrier wave;

and further comprising a receiver of said carrier wave, means for deriving said command signal from said carrier wave, means for multiplying the frequency of said command signal by the inverse of said predetermined fraction, means for comparing the phases of said carrier wave and the output signal from said means for multiplying to produce an output signal when the phases of said signals bear a predetermined phase relationship to one another and means responsive to an output signal from said phase comparator for a specified length of time for performing a predetermined function.

15. A transmitter for remotely controlling a remote receiver comprising:

a source of a carrier wave;

means to derive a command signal from said carrier wave having a time parameter having a fixed relationship with the frequency of said carrier wave;

means to modulate said carrier wave with said command signal; and means to transmit the modulated carrier wave;

wherein said means to derive a command signal derives a plurality of command signals from said carrier wave, each having a different time parameter, and comprises selector means for selecting a particular command signal for transmission for controlling a particular remote receiver.

16. The combination according to claim 15 further comprising a receiver for receiving the transmitted modulated carrier wave, said receiver comprising:

means to derive a reference signal from said received carrier wave having a time parameter which is a function of the frequency of said received carrier wave, means to detect said command signal modulated on said received carrier wave, comparison means for comparing said time parameters of said detected command signal and said reference signal and for providing a control signal in response to a predetermined relationship between said time parameters, and apparatus controlled by said control signal.

* * * * *